June 11, 1940.
C. H. JOHNSON
2,203,730
METHOD AND APPARATUS FOR DETERMINING THE
STRIKE AND DIP OF SUBSURFACE STRATA
Filed Jan. 27, 1939
2 Sheets-Sheet 1
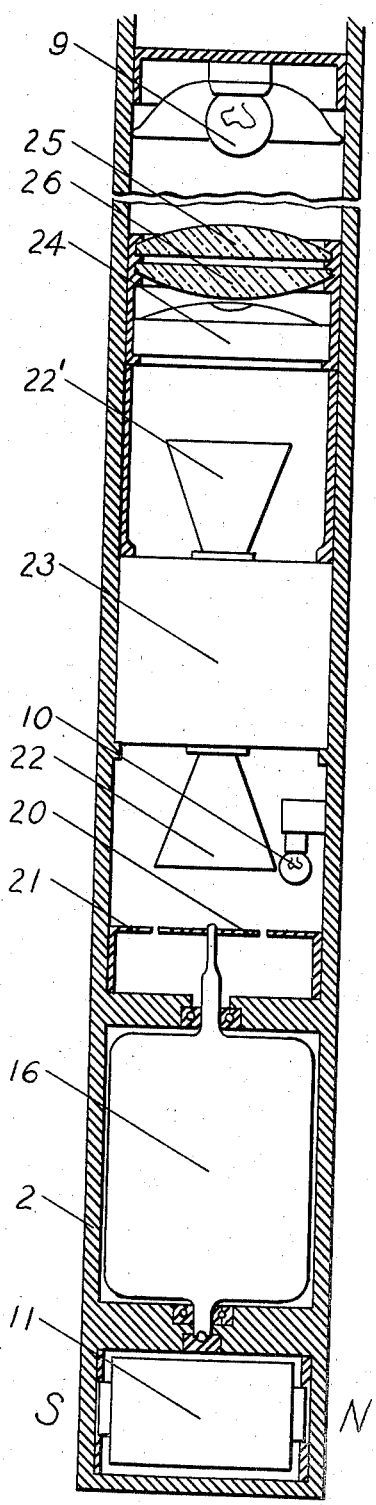
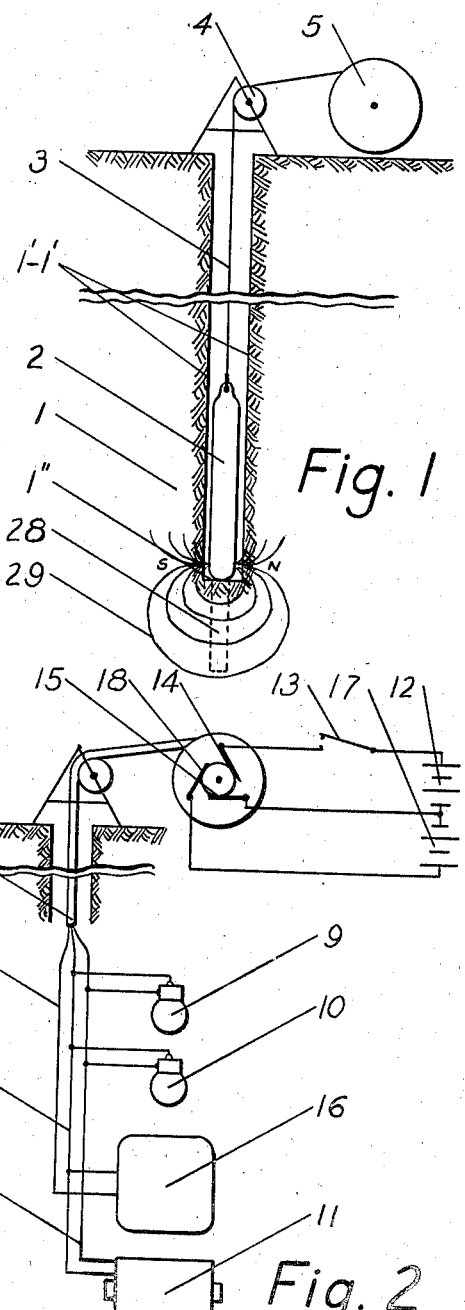
INVENTOR.
Curtis H. Johnson June 11, 1940.　　　　C. H. JOHNSON　　　　2,203,730
METHOD AND APPARATUS FOR DETERMINING THE
STRIKE AND DIP OF SUBSURFACE STRATA
Filed Jan. 27, 1939　　　2 Sheets-Sheet 2

INVENTOR.
Curtis H. Johnson

Patented June 11, 1940

2,203,730

UNITED STATES PATENT OFFICE 2,203,730

METHOD AND APPARATUS FOR DETERMINING THE STRIKE AND DIP OF SUBSURFACE STRATA

Curtis H. Johnson, Santa Monica, Calif.

Application January 27, 1939, Serial No. 253,128

20 Claims. (Cl. 255—1)

This invention relates in general to the art of drilling bore holes in the earth, and in particular it relates to the determination of the strike and dip of the earth's strata penetrated by the bore hole.

In general, methods of determining the strike and dip of the material penetrated by a bore hole in the earth have consisted of removing a sample, or core, from the bore hole; determining an azimuthal reference line on the core; determining the apparent amount and direction of the dip of the stratification visible in the core—measured with respect to the axis of the core and to its azimuthal reference line; determining the amount and direction of the deviation of the axis of the core from the vertical; and correcting the apparent amount and direction of dip of the stratification for the deviation of the axis of the core from the vertical to obtain the true dip of the stratification in the core.

It is an object of this invention to provide an improved method and means for determining an azimuthal reference line on the core. It is a further object of this invention to provide a method and means for combining part of the operation of determining an azimuthal reference line on the core with the operation of determining the amount and direction of the deviation of the axis of the core from the vertical. Another object of this invention is to provide a method and means for magnetically polarizing the material to be cored and to determine the direction in which such polarization takes place. Another object of this invention is to provide a method and means for magnetically polarizing in a predetermined direction the material to be cored. Other aims and objects of the invention will appear from the following description, in which:

Figure 1 shows a section of a bore hole in the earth, and schematic means for lowering apparatus of the invention into the bore hole.

Figure 2 shows a wiring diagram for one form of the apparatus in which the power and the control is supplied from the surface.

Figure 3 illustrates the combination of means for determining the amount and direction of the deviation of the axis of the core from the vertical with the means for magnetically polarizing the material to be cored and determining the direction of such polarization.

Figure 4:
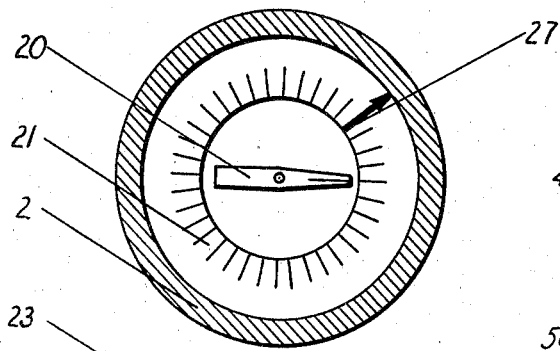
Figure 4 is a plan view of the scale which is photographed by the means shown in Figure 3.

The method of the invention consists in magnetically polarizing the material of the earth in a known azimuthal orientation prior to taking the core; determining the amount and direction of the deviation of the axis of the bore hole from the vertical; removing the core from the earth; determining the orientation in the core of the magnetic polarity previously impressed on the core—and thereby determining a known azimuthal line on the core; determining the apparent strike and dip of the stratification in the core with respect to the axis of the core and to the aforesaid known azimuthal line on the core; and correcting the aforesaid apparent strike and dip for the aforesaid deviation of the axis of the core from the vertical to obtain the true strike and dip of the stratification in the core.

Referring to Figure 1, formation 1 is penetrated by a bore hole with walls 1'—1' and bottom 1''. Apparatus to be described below in greater detail is enclosed in pressure tight case 2 which is lowered into the bore hole as by cable 3, pulley 4, cable drum 5, and prime mover not shown.

Figure 5:
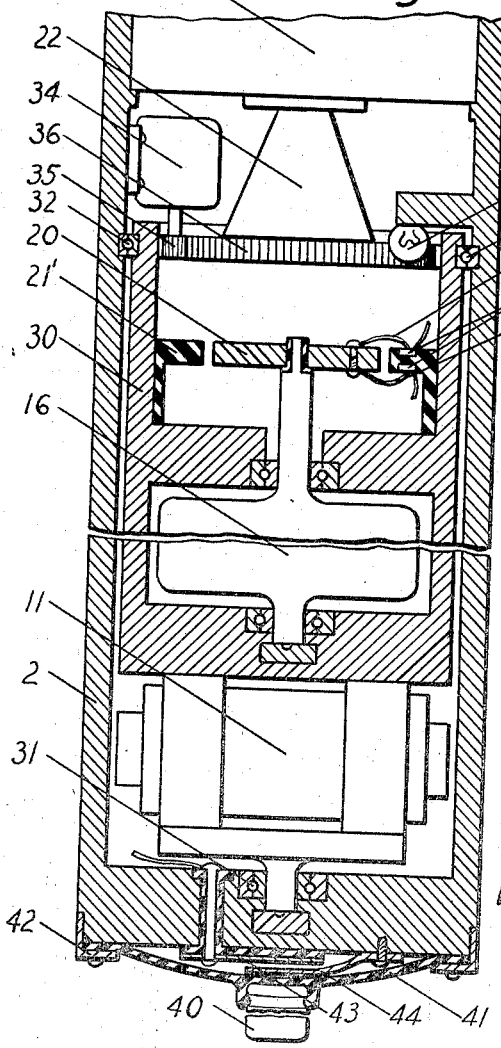
Figure 5 shows an alternate form of the apparatus by means of which the material to be cored may be magnetically polarized in a predetermined direction—and shows a power control operable in the bore hole rather than from the surface.
Figure 6:
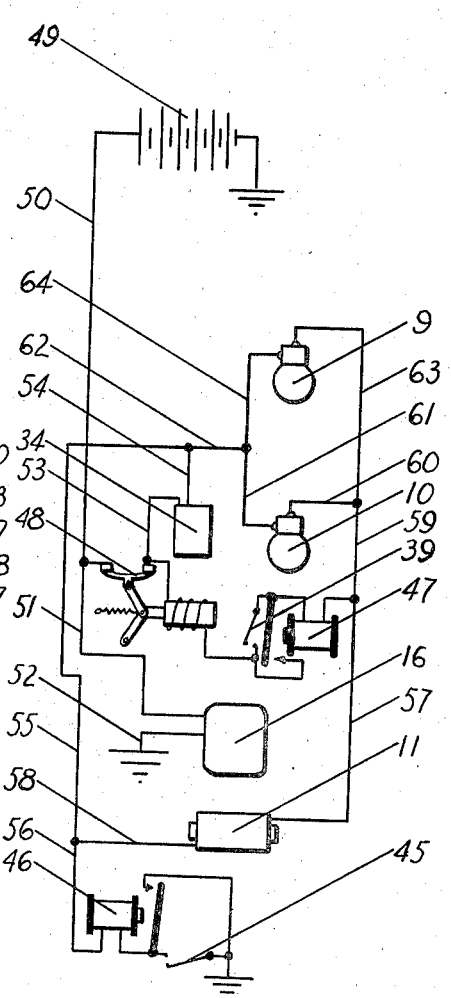
Figure 6 is a diagram of wiring useful in connection with the apparatus of Figure 5.

In Figure 2, cable 2 is shown to contain electric conductors 6, 7, and 8, of which 6 and 7 furnish electric current to lamps 9 and 10 and to electro-magnet 11 from battery 12 at the surface via switch 13 and slip rings 14 and 15 on cable drum 5. Conductors 7 and 8 supply current to gyroscope 16 from battery 17 at the surface via slip rings 15 and 18. These circuits are intended to be purely conventional except as regards the inclusion of electro-magnet 11 therein. The battery and means serving the function of switch 13 may be carried by case 2, eliminating the necessity for conductors coming to the surface. Such an alternate arrangement is shown in Figures 5 and 6.

Referring to Figure 3, a somewhat schematic diagram of means for determining the amount and direction of the deviation of the axis of the bore hole from the vertical is shown in connection with electro-magnet 11, which becomes polarized as shown by the symbols N. S. when energized. The aforesaid means consist of gyroscope 16, gyroscope oriented pointer 20, azimuth scale 21, focussing members 22 and 22', camera 23, bubble box 24, lens system 25—26, and lamps 9 and 10. Further structural details on these means are shown in Figures 3 and 5 of U. S. Patent No. 1,959,141 issued May 15, 1934 to Elmer A. Sperry, Jr. for Bore hole position indicator.

Pointer 20 and azimuth scale 21 are shown in plan in Figure 4. In addition to its graduations, azimuth scale 21 is provided with an index 27 which is fixed to case 2, and indicates the direction of the north pole of electro-magnet 11 when it is energized.

The operation of the above apparatus is as follows:

Prior to removing core 28, shown by dotted lines in Figure 1, gyroscope 16 is started, and the orientation of pointer 20 is noted. Case 2 and its contents are then lowered to the bottom of the bore hole as by the means shown. When the case is in that position, switch 13 is closed momentarily, thus momentarily energizing electro-magnet 11 and lighting lamps 9 and 10. When electro-magnet 11 is energized, a magnetic field is set up in the surrounding earth as schematically shown by lines 29 in Figure 1. The material composing core-to-be 28 is thus magnetically polarized in the same azimuthal direction as electromagnet 11, this direction being indicated on azimuth scale 21 by index 27.

Most materials composing the earth's substrata possess more or less magnetic retentivity, sufficient, as a matter of fact, so that under the influence of the natural, relatively weak magnetic field of the earth they retain enough magnetic polarity to permit the fairly successful use of methods such as those described in U. S. Patents No. 1,792,639; 2,104,752; and 2,105,650, to determine the original azimuthal orientation of cores by means of the naturally retained magnetic polarity. By the method of this present invention, a magnetic field greatly in excess of that normally present in the earth may be impressed on core-to-be 28, and thus cores whose materials have very little retentivity may be successfully oriented.

At the instant when electromagnet 11 polarizes core-to-be 28, lamps 9 and 10 light momentarily, thereby simultaneously photographing pointer 20, scale 21, and bubble box 24, as described in greater detail in the Sperry patent referred to above. The composite photograph indicates not only the direction and amount of the deviation of the axis of the bore hole from the vertical, but, by means of index 27, also indicates the azimuthal direction of the magnetic polarization of core-to-be 28.

Following the above operation, core 28 is removed by any of the conventional methods.

Upon the removal of core 28 to the surface, its magnetic polarity transverse to its axis may be determined. For this purpose I may employ apparatus similar to that described in U. S. Patents No. 1,792,639; 2,104,752; or 2,105,650, though such use was not contemplated by the inventors thereof, since the method of my invention of imposing an artificial magnetic polarity in a known direction on the earth's substrata to be cored was not then known.

Having determined the magnetic polarity of the core, and knowing from the above composite photograph the azimuthal direction of the impressed magnetic polarity, a line of known azimuth may be drawn on the core. Thereafter, by means well known to those skilled in the art, the apparent strike and dip of the stratification in the core may be determined, and by further means well known to those skilled in the art the correction for the deviation of the axis of the core from the vertical may be made, and the true strike and dip of the stratification in the core obtained.

Though I have described the method in its preferred form of magnetically polarizing the material to be cored, determining the azimuth of this polarization, and determining the deviation of the axis of the bore hole from the vertical—all in one operation, it should be understood that this is not necessary. It would be just as accurate, if less convenient, to magnetically polarize the material to be cored and determine the azimuth of such polarization in one step, and determine the deviation of the axis of the bore hole from the vertical in a second step. This latter method might be advantageously employed if an independent bore hole survey were made after the hole was completed. In this case, the bubble box and the means for photographing the bubble may be omitted from the device of Figure 3.

The method and means hereinabove described is characterized by its operation to magnetically polarize the material to be cored and determine the direction of such polarization. The polarization may be in any direction, depending upon the purely random orientation of the electro-magnet when it is energized. Under some circumstances it may be advantageous to magnetically polarized the material to be cored in a predetermined direction, such as True North, Magnetic North, etc. Modified apparatus for this purpose is shown in Figures 5 and 6, in which, incidentally, the circuits are arranged for operation without electric conductors coming to the surface.

In Figure 5 electro-magnet 11 is shown rigidly attached to inner case 30, with which it is rotatively mounted in case 2 as by bearings 31, 32, and 33. Motor 34, mounted inside case 2, is arranged to slowly rotate inner case 30 and electro-magnet 11 with respect to case 2, as by pinion gear 35 and internal ring gear 36.

Gyroscope 16 is mounted within inner case 30 in a manner similar to its mounting in case 2 as shown in Figure 3. As in Figure 3, pointer 20 is oriented by gyroscope 16 and appears in the photographed record together with azimuth scale 21' (similar to azimuth scale 21) as shown in Figure 4. However, in the modified apparatus of Figures 5 and 6, pointer 20 carries light flexible contact brushes 37, and scale 21' is composed of an electric insulator and carries contacts 38, which, with brushes 37, form switch 39 of Figure 6, and act in the electric circuit as will hereinafter be described. Azimuth scale 21' fits just tightly enough inside inner case 30 so that it may be turned and will remain where it is placed.

Since, in the modified apparatus of Figures 5 and 6 the power supply is contained in case 2, switching means for initiating the polarizing and photographing action must be provided. One form which this switching means may take is a switch on the bottom of case 2, shown in Figure 5, and comprising rod 40, flexible water-tight diaphragm 41 sealed to case 2 (as by flange 42) and enclosing switch contacts 43 and 44, which together constitute switch 45 of Figure 6, adapted to make contact when pressure is applied to rod 40.

The operations of polarizing and photographing may best be described in terms of Figure 6, in which elements not heretofore described are self holding relays 46 and 47, and circuit breaker 48. The operation is as follows:

During all the time the apparatus is in the bore hole, gyroscope 16 is supplied with current from battery 49 via conductors 50, 51, and 52, and the ground return.

When rod 40, of Figure 5, strikes the bottom of the bore hole switch 45 is closed, at least momentarily. When switch 45 is closed, self holding relay 46, in parallel with switch 45, closes and continues to complete the circuit initially completed by the closing of switch 45—even though switch 45 should thereafter open. Th circuit so closed supplies current to motor 34 from battery 49 via conductor 50, circuit breaker 48, conductors 53, 54, 55, and 56, self holding relay 46, and the ground return.

As seen in Figure 5, motor 34, being so energized, rotates inner case 30 and electro-magnet 11 with respect to case 2. Gyroscope 16 and gyroscope pointer 20, due to the gyroscopic action, do not turn with inner case 30. Thus contacts 38 will rotate until they make contact with brushes 37, thereby closing switch 39 of Figure 6.

When switch 39 is closed, it would ordinarily have to carry a large current for energizing electro-magnet 11 and lighting lamps 9 and 10. To minimize the current carried by the light flexible brushes of switch 39, switch 39 is paralleled by the switch contact of self holding relay 47. This contact, being of low resistance compared to the brushes of switch 39, carries most of the current when it is closed by the current carried initially by switch 39.

When self holding relay 47 is closed, electro-magnet 11 is energized from battery 49 via conductor 50, circuit breaker 48, the tripping coil of circuit breaker 48, self holding relay 47, conductors 57, 58, and 56, self holding relay 46, and the ground return.

When self holding relay 47 is closed, current is also supplied to lamp 10 from battery 49 via conductor 50, circuit breaker 48, the tripping coil of circuit breaker 48, self holding relay 47, conductors 59, 60, 61, 62, 55, and 56, self holding relay 46 and the ground return.

When self holding relay 47 is closed, current is also supplied to lamp 9 from battery 49 via conductor 50, circuit breaker 48, the tripping coil of circuit breaker 48, self holding relay 47, conductors 59, 63, 64, 62, 55, and 56, self holding relay 46, and the ground return.

As soon as the field builds up on the coil of circuit breaker 48, circuit breaker 48 is tripped, whereupon motor 34 comes to a stop, and the current to electro-magnet 11 and lamps 9 and 10 is cut off. The period of the build up of the field of the coil of circuit breaker 48 is so chosen that there is sufficient time for the field of electro-magnet 11 to build up to maximum, and for lamps 9 and 10 to have properly exposed the film in camera 23.

Though I have described my invention in terms of certain apparatus, it should not be limited thereby, but only by the claims.

I claim:

1. The method of determining the strike and dip of substrata of the earth which includes the steps of impressing a polarity on said substrata, determining the direction of said polarity prior to removing a sample from said substrata, removing a sample from said substrata, and determining the direction of said polarity in said sample after removing said sample from said substrata.

2. The method of determining the strike and dip of substrata of the earth which includes the steps of impressing a magnetic polarity on said substrata, determining the polarity of said substrata prior to removing a sample from said substrata, and determining the direction of said polarity in said sample after removing said sample from said substrata.

3. The method of determining the strike and dip of substrata of the earth which includes the steps of impressing a magnetic polarity on said substrata, determining the direction of said polarity prior to removing a sample from said substrata, determining the direction of a reference axis in said sample, removing said sample from said substrata, and determining the direction of said polarity in said sample after removing said sample from said substrata.

4. The method of determining the strike and dip of substrata of the earth which includes the steps of impressing a magnetic polarity on said substrata, simultaneously determining the direction of said polarity and of a reference axis in said sample prior to removing said sample from said substrata, removing said sample from said substrata, and determining the direction of said polarity in said sample after removing said sample from said substrata.

5. The method of determining the strike and dip of substrata of the earth which includes the steps of impressing a magnetic polarity on said substrata in a known direction, removing a sample from said substrata, and determining the direction of said polarity in said sample after removing said sample from said substrata.

6. The method of determining the strike and dip of substrata of the earth which includes the steps of impressing a polarity on said substrata in a known direction, and determining the direction of said polarity in a sample taken from said substrata.

7. The method of determining the strike and dip of substrata of the earth which includes the steps of impressing a magnetic polarity on said substrata in a known direction, determining the direction of a reference axis in a sample of said substrata, removing said sample from said substrata, determining the direction of said polarity in said sample, and determining the amount and direction of dip of the stratification in said sample with respect to said reference axis and the direction of said polarity.

8. The method of determining the strike and dip of substrata of the earth which includes the steps of impressing a magnetic polarity on said substrata in a known direction, determining the direction of a reference axis in a sample of said substrata, removing said sample from said substrata, determining the direction of said polarity in said sample, determining the amount and direction of dip of the stratification in said sample with respect to said reference axis and the direction of said polarity, and correcting said amount and direction of dip to refer to the vertical and a horizontal reference line.

9. The method of determining the strike and dip of substrata of the earth which includes the steps of impressing a magnetic polarity on said substrata in a known direction, removing said sample from said substrata, determining the direction of a reference axis in the hole from which said sample was taken, determining the direction of said polarity in said sample, and determining the amount and direction of dip of the stratification in said sample.

10. In combination, means for impressing a remanent polarity in a known direction in a medium surrounding a bore hole and means for determining the direction of said bore hole.

11. In combination, means for impressing a remanent magnetic polarity in a known direction in a medium surrounding a bore hole and means for determining the direction of said bore hole.

12. In combination, means independent of surface power supply for impressing a remanent polarity in a known direction a medium surrounding a bore hole and means for determining the direction of said bore hole.

13. In combination, means for impressing a remanent polarity in a known direction in a merium surrounding a measuring instrument, and means for determining the orientation of said measuring instrument.

14. In combination, means for impressing a remanent polarity in a medium surrounding a measuring instrument, and means for determining the orientation of the polarization induced in said medium.

15. In the art of rock sampling, the improvement which comprises the steps of introducing an oriented magnetizer adjacent the rock to be sampled, causing said magnetizer to polarize the rock in the direction of orientation of said magnetizer, and removing a sample of rock which has been so polarized, thereby providing a magnetic index by means of which the original position of the sample in the earth can be determined after removal of the sample.

16. A method of taking rock core samples which comprises impressing an artificial polarization in a known direction on the rock to be cored, and removing a core sample retaining said polarization.

17. The method of determining the strike and dip of substrata of the earth which includes the steps of impressing a polarity on said substrata in a predetermined direction, removing a sample from said substrata, and determining the direction of said polarity in said sample after the removal of said sample from said substrata.

18. In combination, means for impressing a remanent polarity in a medium surrounding a bore hole, and means for orientating said first named means in a predetermined direction inside said bore hole.

19. In the art of rock sampling, the improvement which comprises the steps of introducing an oriented magnetizer adjacent the rock to be sampled, causing said magnetizer to polarize the rock in the direction of orientation of said magnetizer, thereby providing a magnetic index by means of which the original position of a sample removed from such polarized rock can be determined.

20. The method of determining the strike and dip of substrata of the earth which includes the steps of impressing a polarity on said substrata in a known direction in the vicinity of a bore hole in said substrata, and determining the direction of a reference axis in said bore hole.

CURTIS H. JOHNSON.